United States Patent
Orlowski

(10) Patent No.: US 6,182,972 B1
(45) Date of Patent: Feb. 6, 2001

(54) UNITARY BEARING SEAL

(75) Inventor: David C. Orlowski, Milan, IL (US)

(73) Assignee: IsoTech of Illinois, Inc., Rock Island, IL (US)

(*) Notice: Under 35 U.S.C. 154(b), the term of this patent shall be extended for 0 days.

(21) Appl. No.: 09/084,443

(22) Filed: May 22, 1998

(51) Int. Cl.[7] ............................................. F16J 15/447
(52) U.S. Cl. ........................ 277/350; 277/412; 277/420; 277/421
(58) Field of Search ................................. 277/350, 412, 277/415, 420, 421

(56) References Cited

U.S. PATENT DOCUMENTS

| | | | |
|---|---|---|---|
| 1,151,965 | * | 8/1915 | Peterson . |
| 4,706,968 | * | 11/1987 | Orlowski . |
| 4,890,941 | * | 1/1990 | Calafell, II et al. . |
| 5,028,054 | * | 7/1991 | Peach . |
| 5,174,583 | * | 12/1992 | Orlowski et al. . |
| 5,378,000 | * | 1/1995 | Orlowski . |
| 5,498,006 | * | 3/1996 | Orlowski . |

* cited by examiner

Primary Examiner—Anthony Knight
Assistant Examiner—John L. Beres
(74) Attorney, Agent, or Firm—Rockey, Milnamow & Katz, Ltd.

(57) ABSTRACT

A mechanical labyrinth seal for rotating shafts having first and second ring members. The first ring member, includes a series of annular axially extending grooves and flanges. The second ring member is adopted for insertion into said first ring member with a plurality of complimentary inwardly extending flanges and grooves to form a well known labyrinth seal. There is a slot or channel through the labyrinth or maze connecting the exterior atmosphere to the interior of the seal assembly. The second ring member is adapted to rotate with the shaft and includes an annular recess near the shaft and inwardly toward the housing. There is a recess in the first ring member to be opposite the recess in said second ring member and a strip of material is inserted via a passage into the recesses of said first and second ring member. The recess second ring member being slightly larger in axial direction than the strip of material. Thus, the seal permits axial movement of the shaft while maintaining the labyrinth seal integrity during a predetermined amount of movement, and upon reaching the limit of said movement, the strip of material accommodate the axial thrust of the shaft movement. The strip of material is made of a material having natural lubricity and has full contact with the walls of the recess, thereby reducing the amount of friction and wear in absorbing the axial thrust.

10 Claims, 1 Drawing Sheet

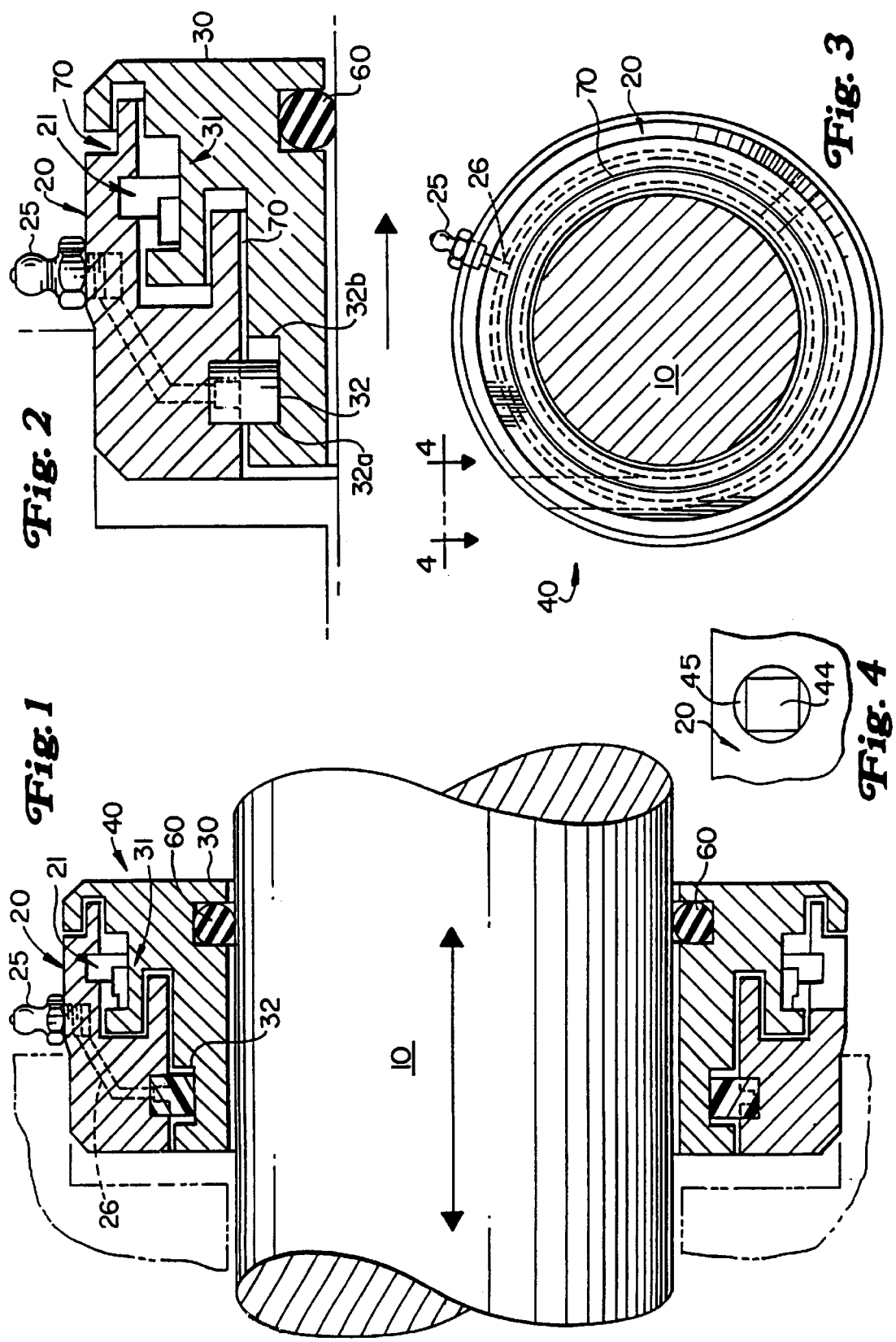

UNITARY BEARING SEAL

BACKGROUND OF THE INVENTION

1) Field of the Invention

It is important to seal rotating shafts to prevent lubricants associated with the bearings from leaking from the bearing housing and also to prevent contaminants in the environment from proceeding into the lubricant of the bearings.

2) Related Art

The invention described in U.S. Pat. No 5,498,006 was designed to alleviate these destructive thrust forces occurring on the faces of the rotator and stator due to the frictional engagement between the rotating member and the stationary member when the shaft is moved axially. This invention is designed to improve this ability to absorb or accommodate the thrust forces occurring on the faces of the rotor and stator due the frictional engagement between the rotating member and the stationary member when the shaft is moved axially. This invention is an improvement over the prior art where the pins used to accommodate the thrust were axially acted upon by the rotator and stator at an arc point. Thus the wear was considerable at that point on the pins so as to deteriorate into a cord contact. This improvement provides a tangential insertion of a rectangular strip of material to absorb the pressure or thrust forces. The strip will absorb the thrust forces across the full face of the circumferential member.

BRIEF SUMMARY OF THE INVENTION

An object of the invention is to provide continuous sealing around rotating shafts and associated housings to prevent leakage of lubricants from the housing and entry of the contaminants into the housings and especially during axial shaft movement or displacement. This improvement results from a tangential insertion of material into a recess formed in stator and a recess formed in the rotating member or rotor, or insertion into recesses in the axially split embodiment (not shown). Two piece labyrinth mechanical seals operate based upon the principle that the labyrinths prevent the migration of the lubricants and/or the contaminants in either direction. There is normally one ring of a labyrinth seal secured to the shaft and one ring affixed to the housing which is to be sealed. This invention is an improvement over prior two-piece or three-piece labyrinth mechanical seals, especially labyrinth seals which are subjected to axial movement of the shaft.

The improvement of this invention is provided in our embodiment by tangentially inserting a strip of material, normally lubricous, through the stationary member into a recess formed in rotor and stator in an area axially removed from the labyrinths in the rotating ring or member. The labyrinths are also designed to allow axial movement of the ring member without the grooves and flanges of the labyrinth abutting each other. The movement of the labyrinth channels, grooves and flanges is limited by the axial engagement of the rotating member with the stationary member. These limits are normally determined by the axial width of the recess and the size of the insert to absorb the thrust. The rotating member is permitted to move with the shaft, a predetermined axial distance before the face of rotating the member abuts the 360 degrees material insert. The size of the insertion permits a predetermined amount of free axial movement of the rotating ring before the axial thrust must be absorbed by the thrust absorbing insert against the radial surface of the corresponding cavity in the rotating member.

It is also possible in utilizing this invention to provide lubrication to the interface between the absorbing material insert and the walls of the recess, and thus further reduce the wear caused by the thrust forces of the axial movement of the shaft. Wear occurring due to the thrust forces between rotor and stator and are minimized by the surface contact between the complementary walls and the insert.

DESCRIPTION OF THE DRAWINGS

FIG. 1—is a sectional view showing the improved sealing structure with a horizontal shaft.

FIG. 2—is an enlarged view of the invention showing the shaft and the rotating member in an extreme axial position.

FIG. 3—is an end view showing the relationship between the various members of the sealing structure including the tangential insert of the thrust of absorbing material.

FIG. 4—is a downward view, from 4—4 of FIG. 3, showing the absorption member inserted into the isolator through the tangential opening.

DETAILED DESCRIPTION OF THE INVENTION

There is a circumferential recess 32 in the rotor 30 and also in the stator 20, said recesses opposed to each other to form a cavity for the insertion of a resilient rectangular strip 44. This strip 44 may be inserted into the isolator through the a tangential opening 45. The diameter of this tangential opening should be equal to the hypotenuse of the resilient strip 44. This rectangular strip ensures that the thrust forces are absorbed across the entire face of this resilient strip 44. This distribution of the thrust forces over a greater area improves the life of the thrust absorption material and enhances the sealing.

There also may be added, though not required, a zerk fitting 25 and a channel 26 cut in the stator 20 to provide a reservoir for grease and/or lubricant to the strip 44. This will provide lubricant at the surface interface between the strip 44 and radial surfaces 32a and 32b.

The second ring member or rotor 30 includes a plurality of inwardly extending flanges and grooves 31 which interface, in a complimentary manner, with the flanges and grooves 21 in the stator 20. The second ring member 30 also contains a recess 32 which is located on the inner side or housing side of the seal 40 and is located near the axial extremity of the rotating member 30. This recess or cavity 32 should be designed to have an axial width slightly greater than the width of the absorption or resilient member 44. The axial travel of the shaft occurs during operation as the shaft seeks magnetic center. The second ring member 30 also contains an "O" ring 60 of elastomeric material firmly fitted in said rotating member 30. This "O" ring 60 provides frictional engagement between the "O" ring 60 and the shaft 10 and rotates the rotating member 30.

A channel or slot 70, as in most labyrinth seals, is formed between the rotating and stationary members 20 and 30 and connects the atmosphere or exterior environment with the interior of the seal 40. This labyrinth may vary in size to allow for the axial movement of the rotating member with respect to the fixed member or ring. This movement should be such that the various flanges and grooves 21 and 31 do not touch each other during the axial movement, but continue to provide a continuous labyrinth. The rotating member 30 may move along with shaft 10 in an axial direction, until the absorption member 44 comes in contact with a side wall 32a or 32b of the cavity or recess.

In FIG. 2, the axial movement of the shaft 60 has been to the right and the rotating member 30 moved axially until the side wall 32a comes into contact with the absorption member 44. This absorption member 44 is normally made of a lubricous material such as Teflon® or a Teflon®derivative. The member 44 to rotor 30 contact is not limited to the point contact as in prior art but is a surface interface of the member 44 with flat surface 32a of the rotor groove or cavity. The same action occurs if the axial movement of the shaft and rotor is to the left.

The axial thrust is absorbed by the member 44 as it is pressed against the side walls 32a or 32b. The frictional engagement between the surfaces of member 44 and side walls 32a and 32b as the rotation occurs is such that low wear and minimum heat occur.

As shown, additional lubrication may be supplied from the zerk fitting 25 through the channel 26 to stator member 20. This grease or lubricant will lubricate the interface between the member 44 and the walls of the cavity 32. Grease or lubricant in the cavity 32 is subjected to centrifugal action caused by the rotation of rotor 30 and may be deposited and cycled back into in the stator 20 when lubrication is not required. This may occur when the member 44 is not in contact with either walls 32a or 32b.

In addition, if the axial movement of shaft 10 should be great enough that additional axial movement of the seal is required, additional axial movement is accommodated by utilizing the normal slipping of the shaft axially past the resilient drive means 60 as described in U.S. Pat. No. 5,174,583.

Having described the preferred embodiment, other features of the present invention will undoubtedly occur to those versed in the art, as will numerous modifications and alternations in the embodiments of the invention illustrated, all of which may be achieved without departing from the spirit and scope of the invention as defined in the appending claims.

What is claimed is:

1. A seal assembly comprising:
 a) a fixed housing;
 b) a shaft; and
 c) a seal, said seal comprising a first ring member surrounding said shaft and affixed to said housing;
 d) a plurality of annular grooves and flanges extending axially at a first portion of said first ring member;
 e) a recess in a second portion axially removed from said first portion of said first ring member;
 f) a second ring member rotatable with said shaft;
 g) a plurality of annular grooves and flanges extending axially in a first axial portion of said second ring member and mating in a complimentary manner with said flanges and grooves in said first ring member forming a labyrinth channel between said first and second ring members;
 h) an annular recess in a second axial portion of said second ring member opposite said recess in said first ring member;
 i) a tangential passage in said first ring member extending to said recess in each of said ring members; and
 j) a strip of material, said strip of material inserted through said tangential passage to circumferentially fill said recess.

2. The invention in accordance with claim 1, wherein the axial dimension of said recess in said second ring member is slightly larger in the axial direction than axial dimension of said strip to allow limited relative axial movement of said second ring member with respect to said first ring member.

3. The invention in accordance with claim 2, wherein said strip is rectangular.

4. The invention in accordance with claim 3, wherein said strip is made of a naturally lubricous material.

5. The invention in accordance with claim 1, wherein said annular recess in said second ring member is rectangular.

6. The invention in accordance with claim 1, wherein said recess in said first ring member is rectangular.

7. The invention in accordance with claim 1, wherein there is a lubricant reservoir connected to said recess in said first ring member.

8. The invention in accordance with claim 1, wherein said grooves and flanges of said first and said second ring members are moveable by a limited amount relative to each other axially as the shaft moves axially relative to the first and second ring members.

9. The invention in accordance with claim 1, wherein said tangential passage is circular.

10. The invention in accordance with claim 9, wherein said tangential passage has a diameter equal to the hypotenuse of said strip.

\* \* \* \* \*